(12) United States Patent
Klemenz

(10) Patent No.: US 11,016,830 B2
(45) Date of Patent: May 25, 2021

(54) ENTITY-BASED SERVICE OPERATION FOR OBJECT-BASED PERSISTENCE

(71) Applicant: SAP SE, Walldorf (DE)

(72) Inventor: Oliver Klemenz, Sinsheim (DE)

(73) Assignee: SAP SE, Walldorf (DE)

( * ) Notice: Subject to any disclaimer, the term of this patent is extended or adjusted under 35 U.S.C. 154(b) by 96 days.

(21) Appl. No.: 16/137,394

(22) Filed: Sep. 20, 2018

(65) Prior Publication Data
US 2020/0097343 A1 Mar. 26, 2020

(51) Int. Cl.
*H04Q 3/72* (2006.01)
*G06F 9/54* (2006.01)

(52) U.S. Cl.
CPC .................. *G06F 9/545* (2013.01)

(58) Field of Classification Search
CPC ....................................................... G06F 9/545
See application file for complete search history.

(56) References Cited

U.S. PATENT DOCUMENTS

| | | | | |
|---|---|---|---|---|
| 10,255,317 B2 * | 4/2019 | Polly | ........ | G06F 16/2448 |
| 2013/0031493 A1 * | 1/2013 | Ritter | ........ | G06F 8/38 |
| | | | | 715/762 |
| 2014/0052483 A1 * | 2/2014 | Laber | ........ | G06Q 10/06 |
| | | | | 705/7.12 |
| 2014/0237345 A1 * | 8/2014 | Di Blas | ........ | G06F 40/14 |
| | | | | 715/234 |
| 2015/0074081 A1 * | 3/2015 | Falter | ........ | G06F 16/2433 |
| | | | | 707/713 |
| 2016/0117322 A1 * | 4/2016 | Ramaswamy | ........ | G06F 16/164 |
| | | | | 707/756 |
| 2018/0121408 A1 * | 5/2018 | Normandin | ........ | G06F 17/245 |

OTHER PUBLICATIONS

Fuguo Wei et al. "PersistOM: an Objects-to-Multivalued Database Mapping Mechanism" (Year: 2009).*
Fuguo Wei et al. "A Mapping Mechanism for Objects Persistence in Multivalued Database". (Year: 2009).*

* cited by examiner

*Primary Examiner* — Doon Y Chow
*Assistant Examiner* — Abdou K Seye
(74) *Attorney, Agent, or Firm* — Fountainhead Law Group P.C.

(57) ABSTRACT

Entity-based service operation upon object-based persistence, is efficiently accomplished utilizing mapping between entities and stored objects. An engine within the persistence layer receives a service call referencing an interface entity. The engine determines a context of a core object in the persistence layer. Based upon the context, the engine constructs from the core object, a prepared object including an entity node. A path between the entity node and a root node of the prepared object may comprise context, or may be derived from only partially reading the core object to construct the prepared object. The engine enriches the entity node with entity data from the service call, to generate an applied object. Referencing the applied object as a parameter, the engine executes the service call on the core object. The engine maps the core object to a result object returned to the interface layer in response to the service call.

20 Claims, 8 Drawing Sheets

ENTITY-BASED SERVICE OPERATION FOR OBJECT-BASED PERSISTENCE

BACKGROUND

Unless otherwise indicated herein, the approaches described in this section are not prior art to the claims in this application and are not admitted to be prior art by inclusion in this section.

Web applications may comprise a user interface (UI) layer overlying a backend layer offering access to a database. One or both layers may rely upon framework(s) in order to effectively integrate with appropriate architecture patterns.

On the UI side, an exemplary framework may leverage OData technology for backend server communication. On the backend side, example frameworks may be established based upon different implementations (e.g., Java or Node.js server).

While an object node (on the backend persistence layer) may correspond to an entity (of the UI layer), processing semantics between these layers can differ substantially. For example, the UI layer may operate to send/receive detached entity data. By contrast, the backend layer may operate on the complete object structure, with persistence calls triggered on the complete object.

Thus on the UI side, for the OData protocol the semantics of data processing may be based upon entities. That is, complex data are expressed by composed entities. UI components are mapped to a hierarchy of those entities.

In contrast, on the backend side the data processing is based upon whole objects. These may comprise a hierarchy of nested nodes starting from a root node.

SUMMARY

Efficient processing of entity-based service operations upon object-based persistence frameworks, utilizes mapping between entities and relevant stored objects. An engine within the persistence layer receives a service call referencing an entity from the interface layer. The engine determines a context of a core object in the persistence layer. The engine constructs a prepared object including an entity node from the core object based upon the context.

A hierarchical path between the entity node and the prepared/applied object's root node, may comprise context resulting from reading of the core object in its entirety. Alternatively, the hierarchical path may be derived by only partially reading the core object only the entity node, during construction of the prepared object.

The engine enriches the entity node with entity data from the service call, to generate an applied object. Referencing the applied object as a parameter, the engine executes the service call on the core object. The engine maps the core object to a result object returned to the interface layer in response to the service call.

In certain embodiments, the engine may comprise the in-memory database engine of an in-memory database responsible for storing the core object in the persistence layer.

An embodiment of a computer-implemented method comprises, an engine of a persistence layer organized according to an object framework, receiving a service call from an interface layer organized according to an entity framework, the service call referencing an entity. The engine determines a context of a core object in the persistence layer. The engine constructs a prepared object from the core object based upon the context, the prepared object including an entity node. The engine enriches the entity node with entity data from the service call, to generate an applied object. The engine references the applied object as a parameter to execute the service call on the core object, and the engine maps the core object to a result object returned to the interface layer in response to the service call.

A non-transitory computer readable storage medium embodies a computer program for performing a method comprising, an engine of a persistence layer organized according to an object framework, receiving a service call from an interface layer organized according to an entity framework, the service call referencing an entity. The engine determines a context of a core object in the persistence layer. The engine constructs a prepared object from the core object based upon the context, the prepared object including an entity node, wherein the engine constructs the prepared object by partially reading the core object only up to the entity node according to a path. The engine enriches the entity node with entity data from the service call, to generate an applied object. The engine references the applied object as a parameter to execute the service call on the core object. The engine maps the core object to a result object returned to the interface layer in response to the service call, the mapping performed according to the path.

An embodiment of a computer system comprises one or more processors and a software program executable on said computer system. The software program is configured to cause an in-memory database engine of a persistence layer organized according to an object framework, to receive a service call from an interface layer organized according to an entity framework, the service call referencing an entity. The software program is configured to cause the in-memory database engine to determine a context of a core object of an in-memory database of the persistence layer, and to construct a prepared object from the core object based upon the context, the prepared object including an entity node. The software program is configured to cause the in-memory database engine to enrich the entity node with entity data from the service call, to generate an applied object. The software program is configured to cause the in-memory database engine to reference the applied object as a parameter to execute the service call on the core object. The software program is configured to cause the in-memory database engine to map the core object to a result object returned to the interface layer in response to the service call, according to a path between the entity node and a root node.

In certain embodiments the mapping is performed according to a path between the entity node and a root node.

According to some embodiments the context comprises the path, and the engine constructs the prepared object by reading an entirety of the core object.

In various embodiments the engine constructs the prepared object by partially reading the core object only up to the entity node, according to the path.

In particular embodiments the prepared object comprises a corresponding key for each of the entity node, the root node, and any sub-nodes of the path.

Some embodiments further comprise the engine examining a complexity of the core object to determine whether to construct the prepared object by reading an entirety of the core object, or to construct the prepared object by partially reading the core object only up to the entity node.

In certain embodiments the core object is stored in an in-memory database of the persistence layer, and the engine comprises an in-memory database engine of the in-memory database.

In various embodiments the applied object is stored in the in-memory database.

In particular embodiments the entity framework comprises OData.

According to certain embodiments the object framework comprises JAVA or Node.js.

The following detailed description and accompanying drawings provide a better understanding of the nature and advantages of various embodiments.

DETAILED DESCRIPTION

Described herein are methods and apparatuses implementing entity-based service operation for object-based persistence. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
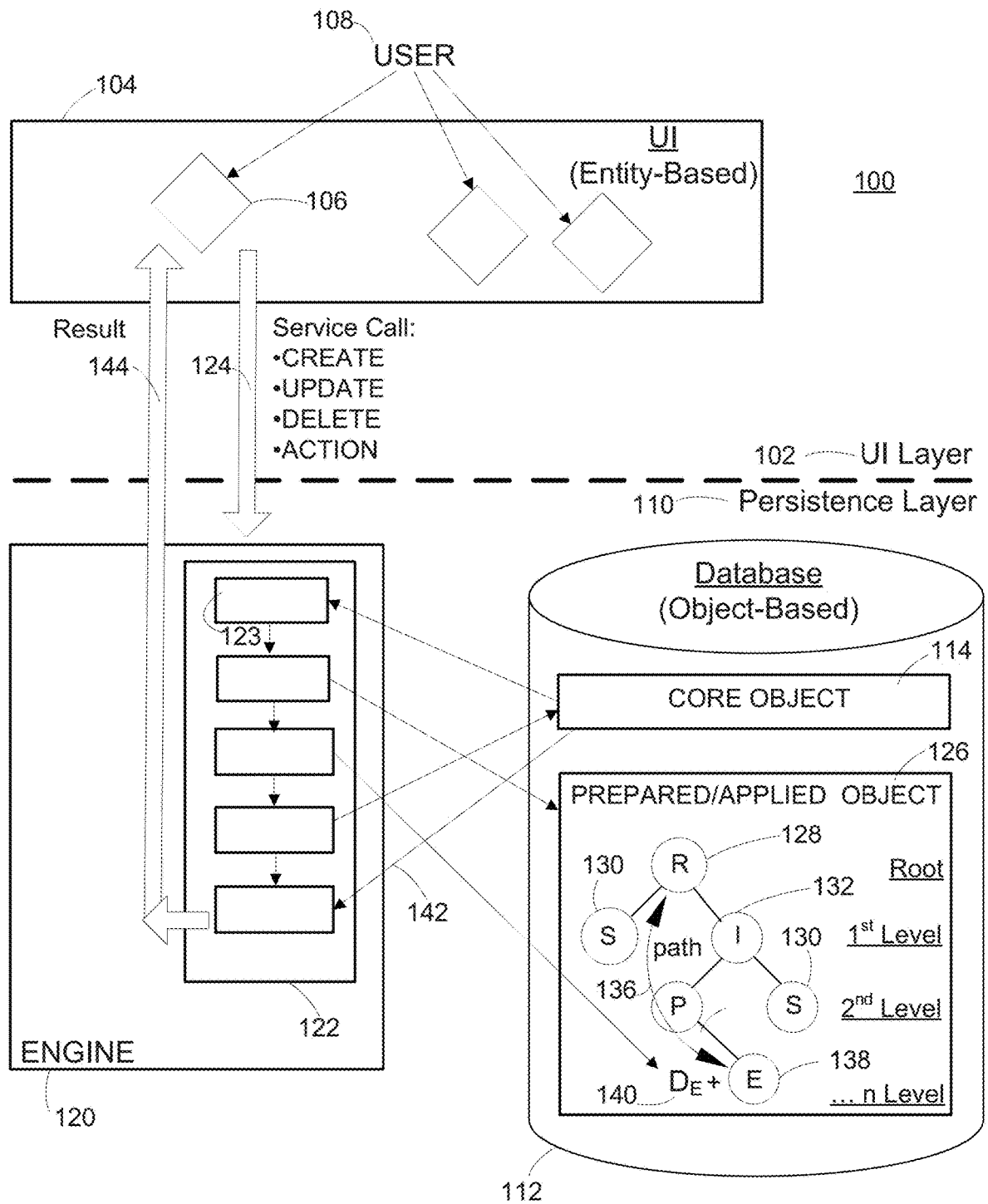
FIG. 1 shows a simplified diagram of a system according to an embodiment.

FIG. 1 shows a simplified view of an example system that is configured to implement entity-based service operation for object-based persistence according to an embodiment. Specifically, system 100 comprises a user interface layer 102 that includes a user interface 104.

The basic organizational structure of that user interface comprises a plurality of loosely-coupled entities 106. The entities represent semantic concepts that are to be accessed and manipulated by the user 108. One example of such an entity is an invoice entity of a Customer Relationship Management (CRM) application.

The actual data for the application is stored in an underlying persistence layer 110. That persistence layer includes a database 112 that includes core objects 114.

As previously emphasized, the core objects of the persistence layer may not be stored according to a same fundamental schema as the entities of the overlying UI layer. For example, while the UI entities may be supported by an OData framework, the core objects of the underlying persistence layer may be supported by an entirely different framework (e.g., JAVA).

Moreover, the core objects of the persistence layer may exhibit a complex, multi-level hierarchical structure reflecting dependencies between data. For example, the structure of a core object of the persistence layer may be represented as a tree structure comprising a root node R, with sub-nodes S depending therefrom in various layers.

Sub-nodes that are present in middle levels of the hierarchy may generically be referred to as intervening nodes I. An intervening node from which another sub-node depends, is generally referred to as a parent node P of that further sub-node.

To facilitate efficient communication of data between the entity-based user interface layer, and the underlying object-based persistence layer, embodiments introduce an engine 120 that is configured to execute a procedure 122 comprising a plurality of steps 123. Details of that procedure are described below in connection with FIG. 2.

In particular, the UI issues a service request 124 to the persistence layer requesting data relevant to a particular entity. In response to receiving this entity service request, the engine executes the specific procedure.

An initial stage of the procedure comprises the engine referencing the core object to obtain context information related thereto. Such context information can include but is not limited to:
  the core object being accessed;
  the node currently accessed of the core object;
  metadata (e.g., field names);
  a build path array from the root node to the currently accessed node (e.g., the path reflecting the hierarchical structure of the core object; and
    others.

In a next stage of the procedure, having established the context information the engine constructs a prepared object 126 reflecting the context information. In particular, the prepared object comprises various nodes, including root node 128, and sub-nodes 130 including intervening nodes 132 and parent nodes 134. The prepared object also comprises a build path 136 reflecting the hierarchical structure of the core object.

As described later below, the procedure by which the prepared object is constructed, may conform to one of at least two possible variants. A first variant reads the entirety (e.g., every node) of the core object.

A second variant reads only a portion of the core object, up to the node which is currently being accessed. The second variant may prove more efficient where a structure of the core object is complex, rendering a complete read operation expensive from a processing standpoint.

Based on the context path information, the core object from the determined context step is traversed and enriched with the sub-node information, down to an entity node E 138. The prepared object is represented as a structural path from a Root node to the entity node In the next stage of the procedure, the engine applies the input to the prepared object. Based upon the nature of the original UI service call, action modes are triggered. Examples of such action modes can include but are not limited to:
  CREATE;
  UPDATE;
  DELETE; and
  ACTION Based upon the action mode, the engine adds relevant entity data $D_E$ 140 to the entity node of the prepared object. The resulting applied object 141 includes the entity as applied input on the corresponding object node data. The applied object comprises the primary key information for the intermediate nodes and the entity data including primary key information for the entity node. The structural hierarchy may be derived by the node nesting in the object representation (e.g. Node.js JSON objects).

The applied object now serves as the parameter for calling the persistence framework object call: i.e. Create, Update, Delete or Action. Having the applied object in place, the persistence framework core object can be called with the applied object as a parameter. Where the object-level service call in the persistence layer is successful, the call returns a response object 142.

A final step of the procedure is the mapping of the persistence call response object to the service call result entity. Leveraging build paths already determined as part of the context, the context node is returned as service call result 144.

Figure 2:
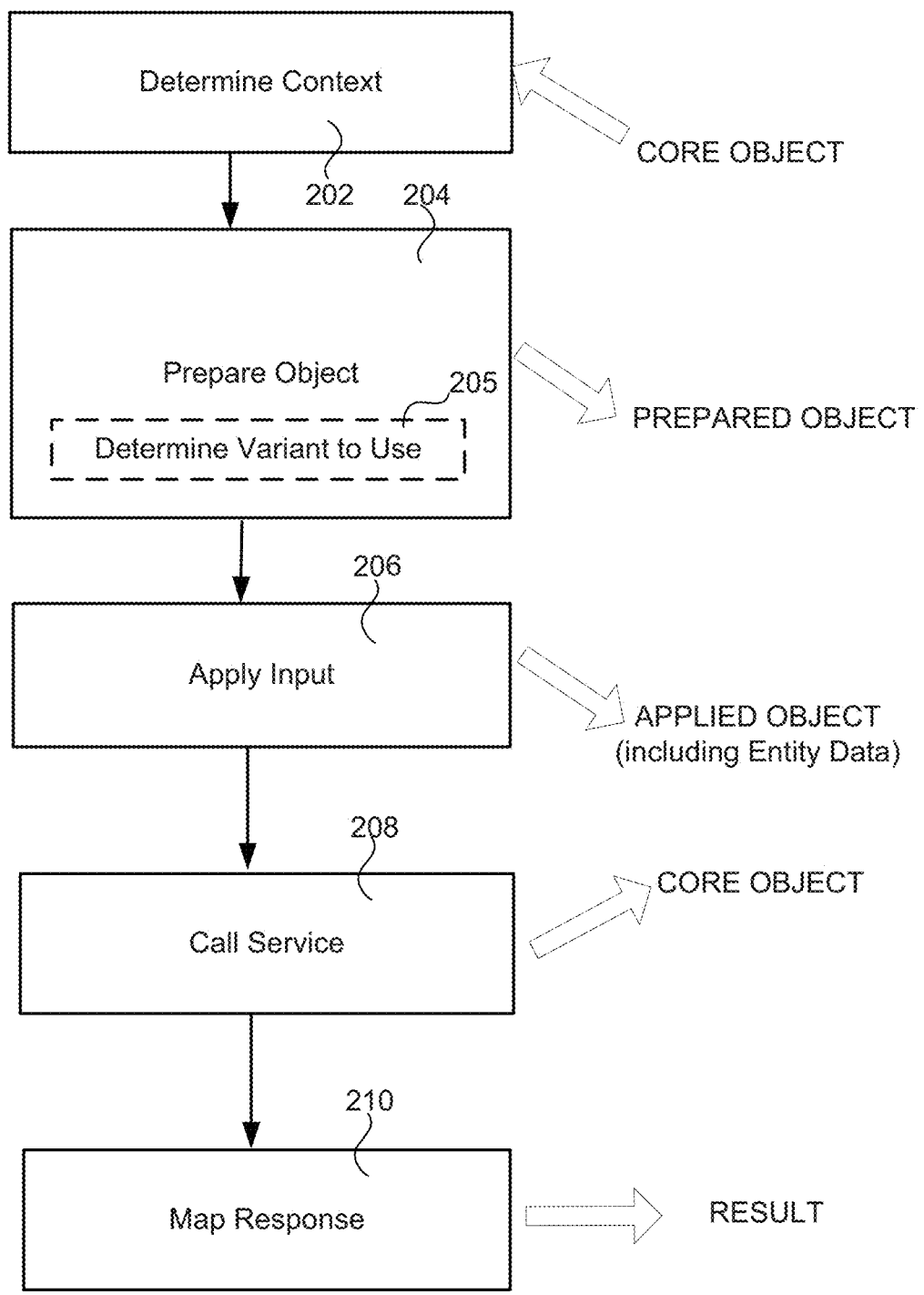
FIG. 2 shows a simplified flow diagram of a method according to an embodiment.

FIG. 2 is a flow diagram showing various actions taken in a method 200 according to an embodiment. At 202, an engine determines context based upon a core object.

At 204, the engine constructs a prepared object. The prepared object is represented as a linear structural path from a root node to an entity node, and includes on each level primary key information for identification purposes.

Optionally, at 205 the engine may determine which variant of a procedure to use in creating the prepared object. While one variant involves reading the complete core object, alternatives may read only a partial object in order to conserve resources.

At 206, the engine applies the input to the prepared object to generate the applied object. That applied object now includes entity data for the entity node.

At 208, the engine calls a service to the core object. Here, the applied object now serves as the parameter for calling the core object of the persistence framework.

At 210, the engine maps the persistence call response object to the service call result entity. This mapping may leverage a context path resulting from a variant of the procedure for preparing the object.

Specific details regarding approaches for generic processing of entity-based data on object-based persistency, are now provided in connection with a particular example.

EXAMPLE

Here, this example is based upon certain technologies available from SAP SE, of Walldorf, Germany. In particular, the UI layer is implemented based upon the SAP UI5 interface, utilizing the OData v2/v4 standard supported by the Node.js framework. The backend layer is implemented by the SAP HANA in-memory database, supported by the Application Object Framework (AOF).

Business applications handled by the SAP technology, may comprise complex data models including deep structured nodes. By contrast, the UI layer (e.g., UI5 and OData) typically operates based upon entities.

Figure 3:
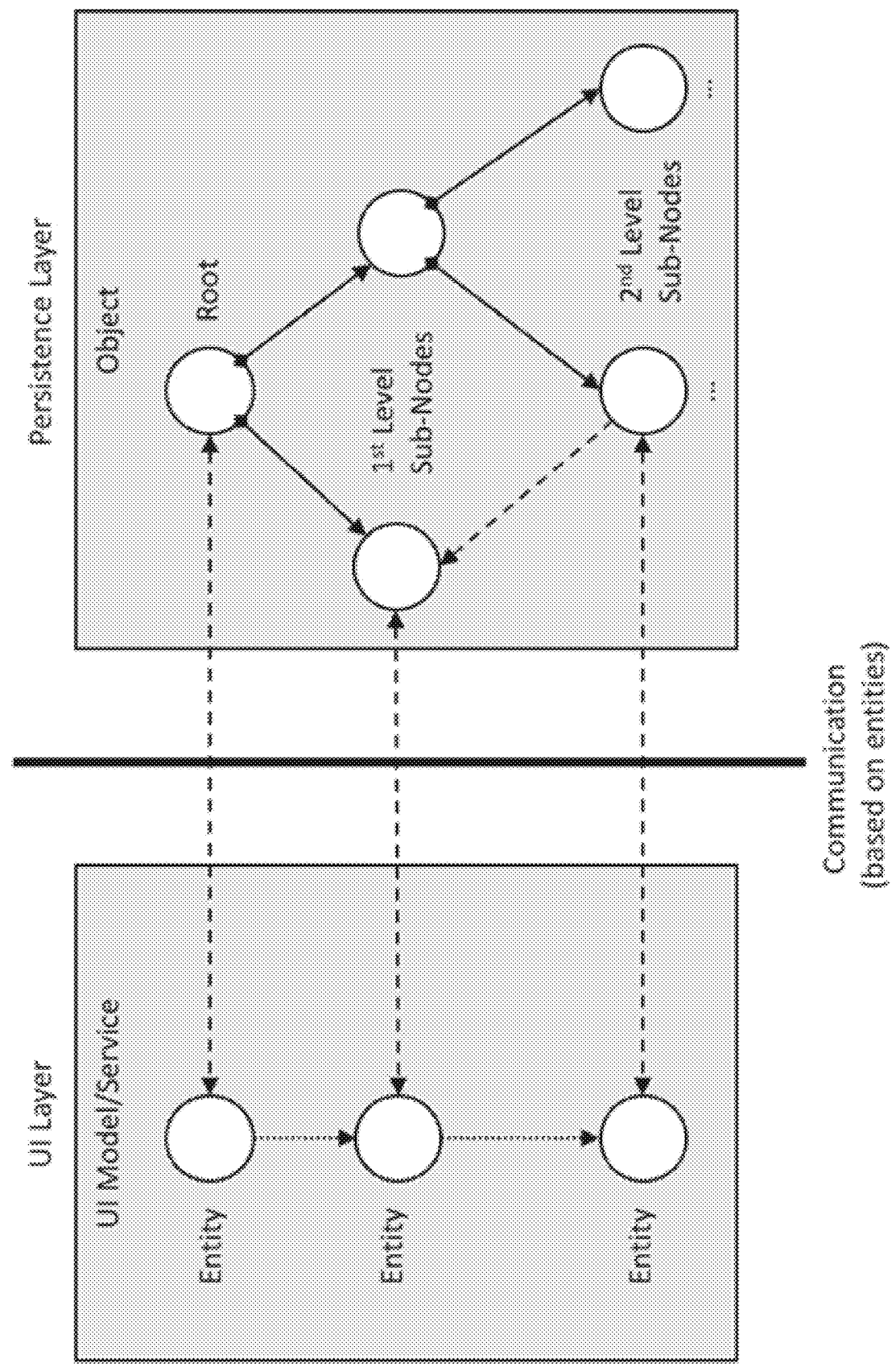
FIG. 3 is a simplified graphical depiction of an (entity-based) UI layer and an (object-based) persistence layer.

FIG. 3 offers a simplified graphical depiction of the UI layer and the backend (persistence) layer. As can be seen, a UI model comprises loosely coupled entities. The leading side for communication is in this case the UI side (for example when using OData).

On the persistence layer side, the entities in the communication call are to be mapped to the (deep) object nodes. The communication call response is to be mapped accordingly.

As outlined in FIG. 2 above, an efficient procedure for processing of entity-based service operations generically on object-based persistence frameworks, may comprise the following:
1) Determine Context
2) Prepare Object
3) Apply Input
4) Call Service
5) Map Response Details regarding each stage in the environment of the instant example, are now provided.

A first step is to determine context. The service call from the UI layer is based on entities (for example in the OData protocol). The backend layer receiving the service call is presented with this loosely-coupled entity, and needs to determine the corresponding object node in the persistence model.

In addition to simply mapping the entity to a node, embodiments may represent how the entity actually relates in the structure to the node hierarchy. A hierarchy path is accordingly established, reaching from the Root node to the mapped entity node and including all primary key and parent key information. This hierarchy path data is called upon later in the next steps of the procedure.

The Determine Context step now takes care of establishing how the provided UI entity is located within the object hierarchy. The context determination step conforms to the process flow of FIG. 4.

Figure 4:
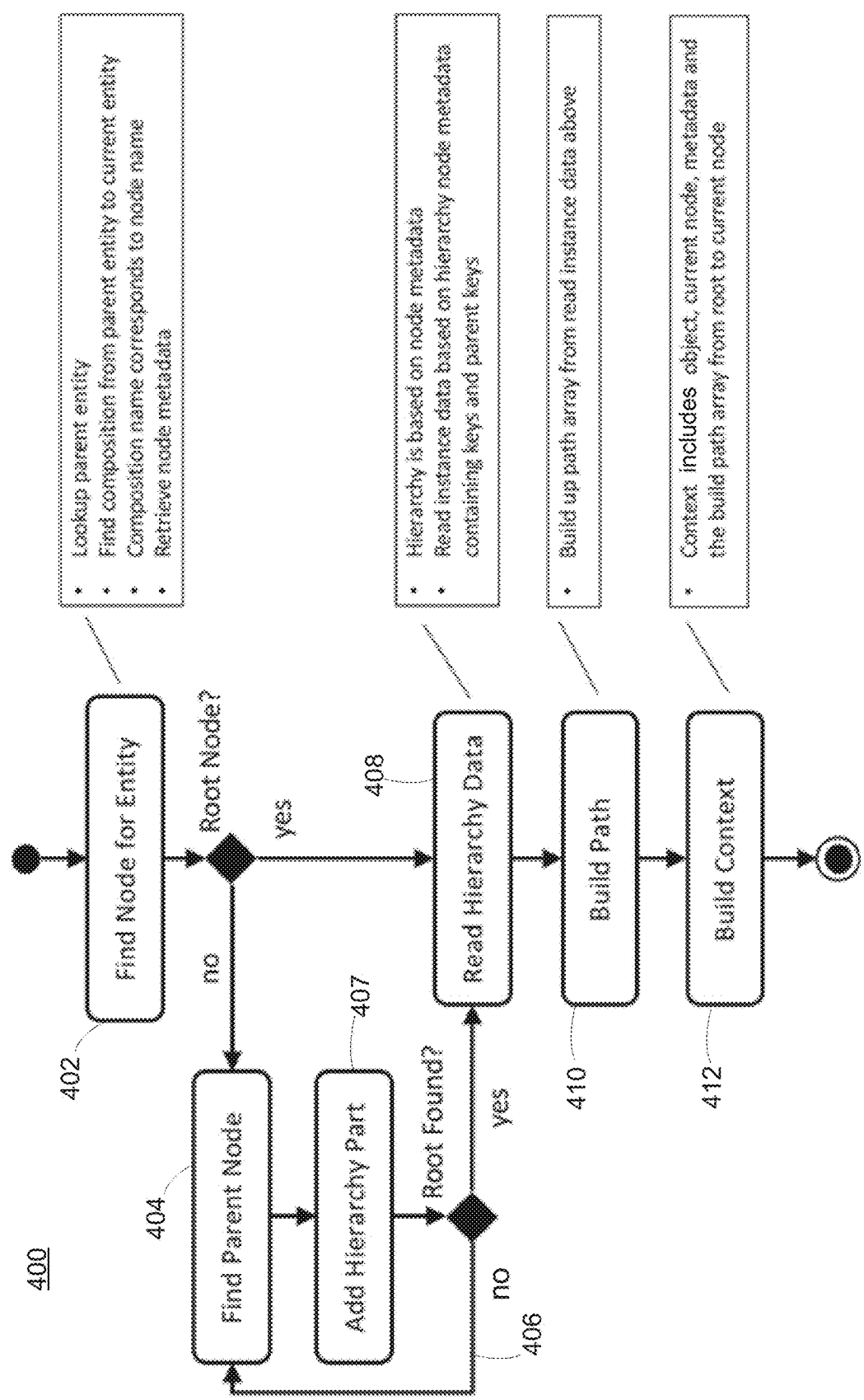
FIG. 4 is a simplified process flow of an exemplary context determination step.

Specifically, the activity diagram 400 of FIG. 4 depicts the following process logic. At 402, the node corresponding to the entity is determined.

In order to accomplish this, the parent entity is determined at 404. The composition relationship between the two nodes is also determined, where the composition name corresponds to the node name.

Now having the node name, the node metadata can be looked up in the object metadata.

If the entity does not correspond to the root entity, the parent entity needs to be found. This activity is executed in a recursion 406, until the Root node is reached. For each recursion iteration, at 407 a hierarchy part is stored including the corresponding metadata information After the Root is found, the hierarchy data is read 408 based on the collected hierarchy parts. This instance information includes keys and parent keys in addition to the node metadata. Each hierarchy part is combined with the corresponding instance data to build 410 the path, which is appended to the list of path parts.

At 412 the resulting context describes the object, the current mapped node, the object and node metadata and the array of path parts, describing how to reach the mapped node from the root node in the whole object Having now established the context, the next step shown in FIG. 2 is to prepare the object for the service call. To call the service on the object, the entity data from the UI call is applied to the current context (especially in the update scenario).

Building up the object according to embodiments, can proceed according to at least two variants.

A first variant reads the complete object via persistence framework read. The object includes the persisted representation of the object including all nodes and sub-node instances.

While this first variant is relatively straightforward to implement, it could adversely affect performance. In particular, during the backend service call the entire object needs to be merged back. This is true despite the fact that (apart from the applied input from the UI entity data) almost nothing has changed.

In order to address this inefficiency for larger objects, a second variant is proposed. In particular, this second variant builds up the object structure as needed for the service call, up to the level required to apply the input.

Figure 5:
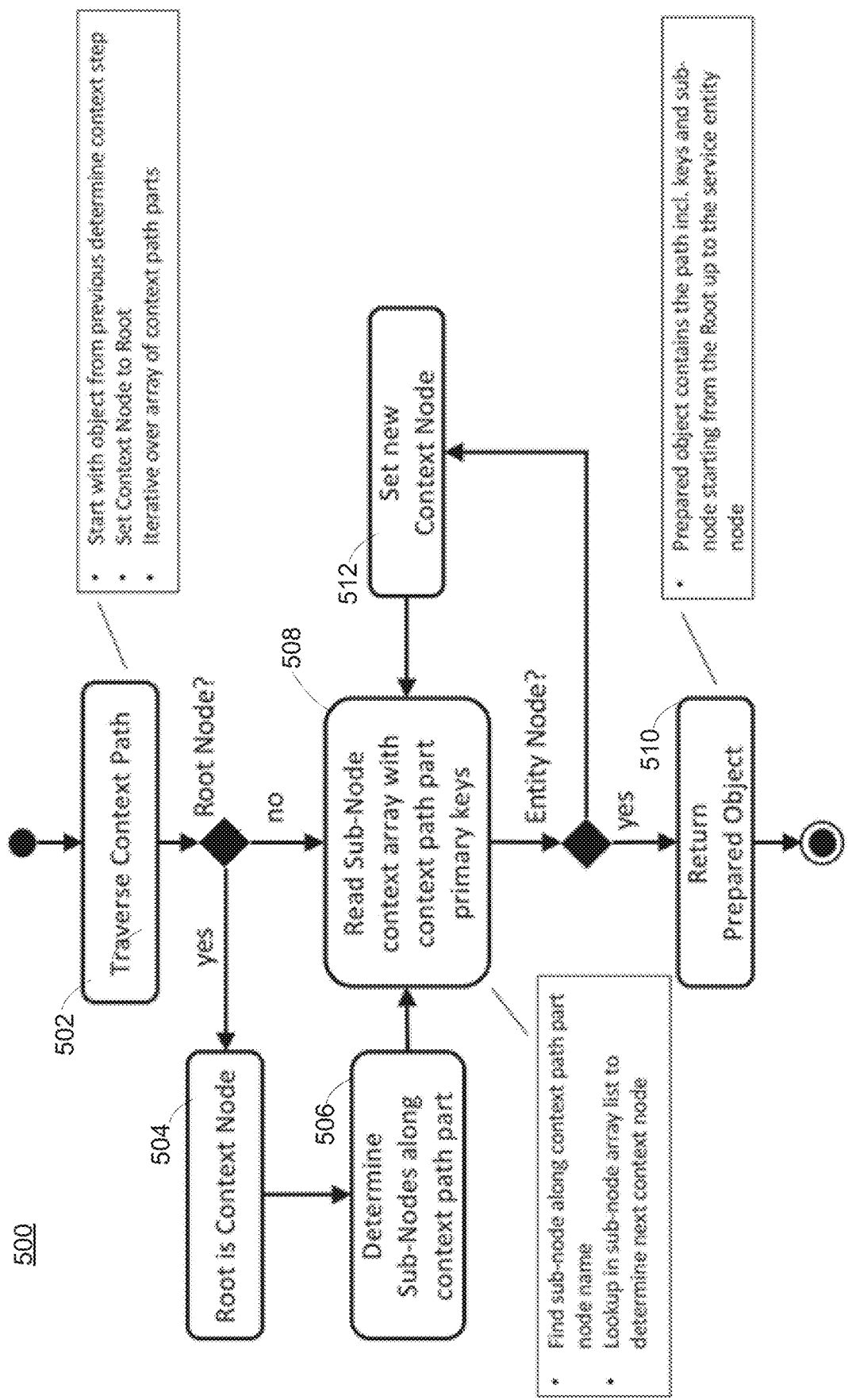
FIG. 5 shows a simplified depiction of a process flow for a variant of an object preparation step.

FIG. 5 offers a simplified depiction of the flow 500 of this object preparation step according to the second variant. In particular, FIG. 5 describes how, based on the context path information, the object from the determined context step is traversed and enriched with the sub-node information, down to the entity node.

This second variant leverages the determined context paths, traversing from Root node to the entity node, establishing all necessary information to perform the service call.

At 502, the context path is traversed. This starts with the object from a previous determine context step. The context node is set to root. It is performed iteratively over array of context path parts.

If a root node is encountered, at 504 the root is the context node. At 506 sub-nodes along a context path part are determined.

If a root node is not encountered, at 508 the sub-node context array is read with context part primary keys. This involves finding the sub-node along the context path part node name. A lookup is performed in the sub-node array list to determine the next context node.

If the node is the entity node, at 510 the prepared object is returned. The prepared object includes the path including keys and sub-node starting from the Root up to the service entity node.

If the node is not the entity node, then at 512 a new context node is set.

Sub-node arrays may warrant special treatment, to ensure for the "complete update mode" use case that all sub-node primary keys are included. Otherwise, a sub-node delete may be assumed.

In the case of the "delta update mode", this special handling may not be needed. There, each sub-node instance has an action code, depicting which sub-node operation is requested.

Figure 6:
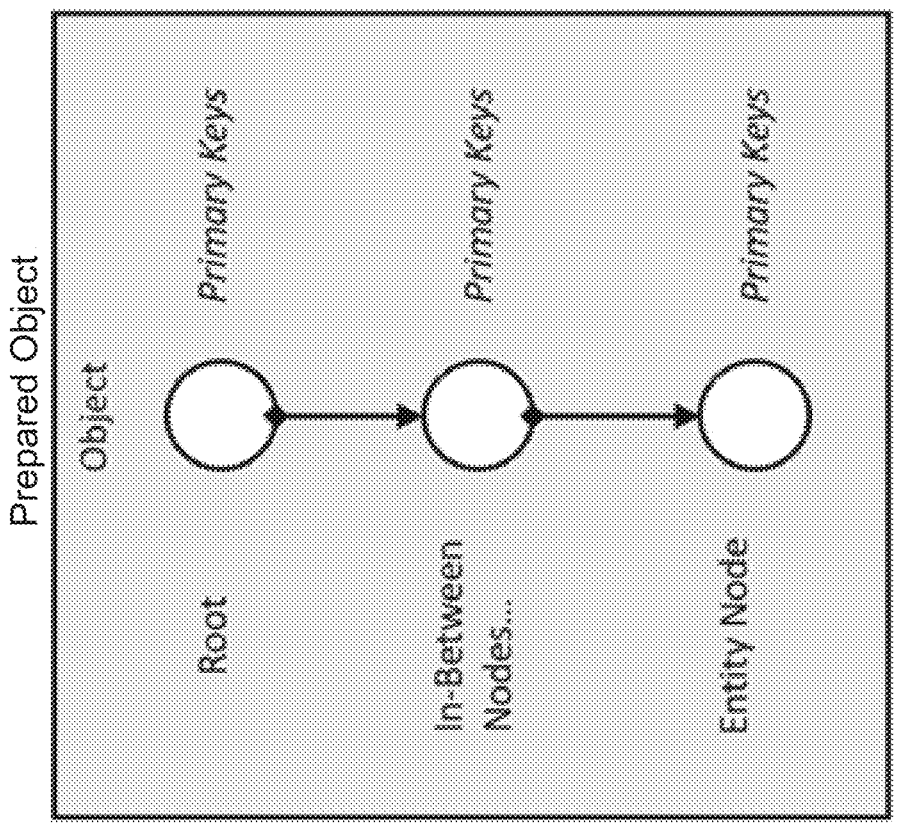
FIG. 6 shows a simplified view of a prepared object represented as a linear structural path from a root node to the entity node.

At the conclusion of the step processing stage, the prepared object is represented as a linear structural path from Root to the entity node. FIG. 6 shows a simplified view of the prepared object.

The prepared object structure includes on each level, only primary key information for identification purposes. In very simple case where the entity corresponds to the Root node, the object will only comprise the level node having its primary keys.

The Apply Input stage of the procedure of FIG. 2, is now discussed for this example. Specifically, having now constructed the prepared object, the context for applying the entity data as input to the object can be implemented.

The action mode is determined. Based upon the nature of the original UI service call, the following action modes are triggered.
CREATE
Case 1: The created entity represents a Root node and therefore the object needs to be created as well.
CREATE Case 2: The created entity represents a sub-node, therefore the node needs to be created in the object and the object needs to be updated.
UPDATE
UPDATE:
The node represented by the entity is updated as well and the object is updated.
UPDATE
DELETE:
Case 1: The deleted entity represents a Root node and therefore the object needs to be deleted as well.
DELETE
Case 2: The deleted entity represents a sub-node, therefore the node needs to be deleted in the object and the object needs to be updated.
UPDATE
ACTION:
The entity action is called on the corresponding object node.
ACTION The logic to apply the input on the corresponding node, is similar to the preparation of the object according to the second variant. This includes addition of the update of the node data with the entity data and determining the service entity call type based on the action modes as depicted in the following table:

| Entity Call | Node | Object Call |
|---|---|---|
| CREATE | Root Node | CREATE |
| | Sub-Node | UPDATE |
| UPDATE | Node | UPDATE |
| DELETE | Root Node | DELETE |
| | Sub-Node | UPDATE |
| ACTION | Node | ACTION |

At the conclusion of this stage, the result is an applied object structure including the entity as applied input on the corresponding object node data. The applied object structure comprises the primary key information for the intermediate nodes, and the entity data including primary key information for the entity node.

The structural hierarchy is derived by the node nesting in the object representation (e.g., Node.js JSON objects).

Figure 7:
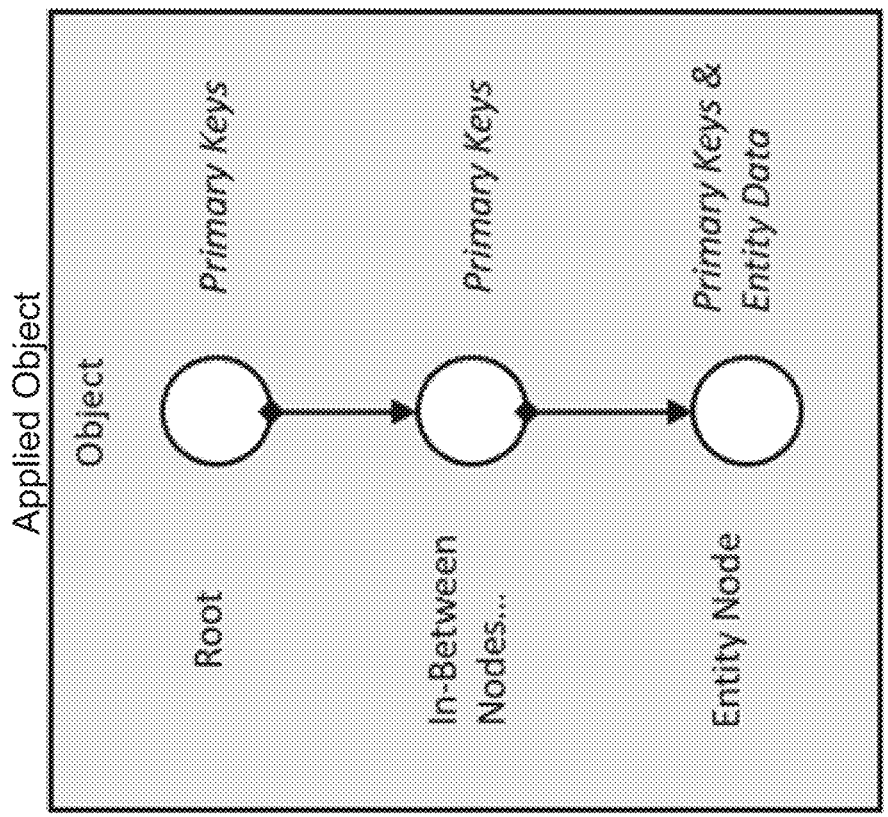
FIG. 7 shows a simplified view of an applied object structure.

The applied object then results in the structure depicted in FIG. 7. That applied object is the parameter for calling the persistence framework object call: e.g., CREATE, UPDATE, DELETE, or ACTION.

Details of this example regarding the "Call Service" stage of FIG. 2, are now discussed. Having the object in place, the persistence framework core object can be called with the prepared object as parameter.

In the case of a success the service call returns a result and the response object, including potential additional data modifications. In the case of an error the service call returns a list of error messages.

In order to conform to the service call requirements, the response object needs to be mapped back to the call context entity. That call context entity is now described in connection with the map response stage.

In particular, the final stage of the procedure of FIG. 2, is to map the persistence call response object to the service call result entity. This may leverage the context paths of the "Prepare Object" step according to the variant 2. The response is according to the purpose of the original service call (e.g., CREATED, UPDATED), with the addition that the context node is returned as service call result. This step is performed on the result object to allow the entity to be returned back to the service call.

In the use case of a node being DELETED, no entity result is returned.

A service transformation can be applied afterwards, if applicable.

While the above example utilizes Node.js (e.g., ODATA) as the supporting UI layer framework, and AOF as the supporting backend layer framework, embodiments are not limited to this particular configuration. On the UI side, commonly SAP UI5 framework is used, leveraging OData technology for backend server communication. On the backend side, also many frameworks have been established on different implementations, e.g., Java or Node.js server. Examples for Java are Spring/Spring Boot, JPA and for Node.js the framework Application Object Framework (AOF), etc., and in ABAP the framework Business Object Processing Framework (BOPF).

Returning now to FIG. 1, while that particular embodiment depicts the engine as located outside of the database storing the core object, this is not required. According to alternative embodiments the engine could be integrated with the database itself, for example to leverage the processing power of the in-memory database engine of the in-memory database storing the object. One example is the HANA in-memory database available from SAP SE of Walldorf, Germany.

Figure 8:
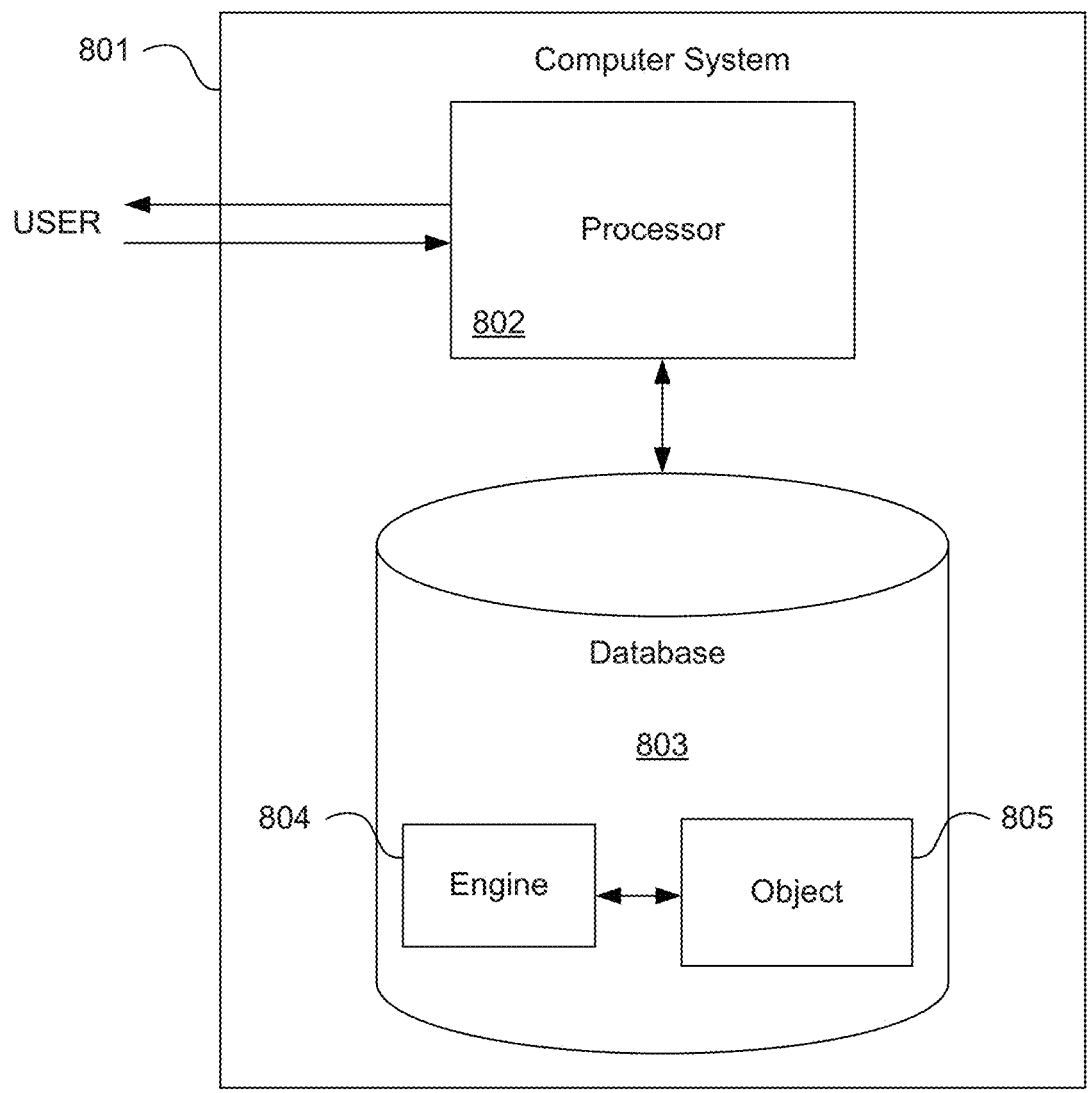
FIG. 8 illustrates hardware of a special purpose computing machine according to an embodiment that is configured to implement entity-based service operation for object-based persistence.

FIG. 8 illustrates hardware of a special purpose computing machine configured to implement entity-based service operation for object-based persistence according to an embodiment. In particular, computer system 801 comprises a processor 802 that is in electronic communication with a non-transitory computer-readable storage medium comprising a database 803. This computer-readable storage medium has stored thereon code 805 corresponding to an object. Code 804 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Embodiments may offer one or more benefits. One possible benefit is simplifying communication between UI and backend layer for single page applications.

Specifically, an automatic and generic mapping between UI entities (e.g., OData entities) and persistence objects (e.g., Application Objects) is established. This mapping takes care of input and output mapping between these two semantic data representations. More specifically, this mapping establishes the entity context in the object structure represented by an object node.

The mapping prepares the object data structure, and applies the service input for persistence modification. Embodiments map the persistence framework response back to the entity semantics, so that the UI layer can process the response data accordingly with respect to the processed entity.

Embodiments may serve to increase the efficiency of the developer. The transparent nature of the logic may allow the developer to concentrate on appropriate mapping of entity data to UI controls, and to write and process the application logic on the complete application object in the persistence layer.

Figure 9:
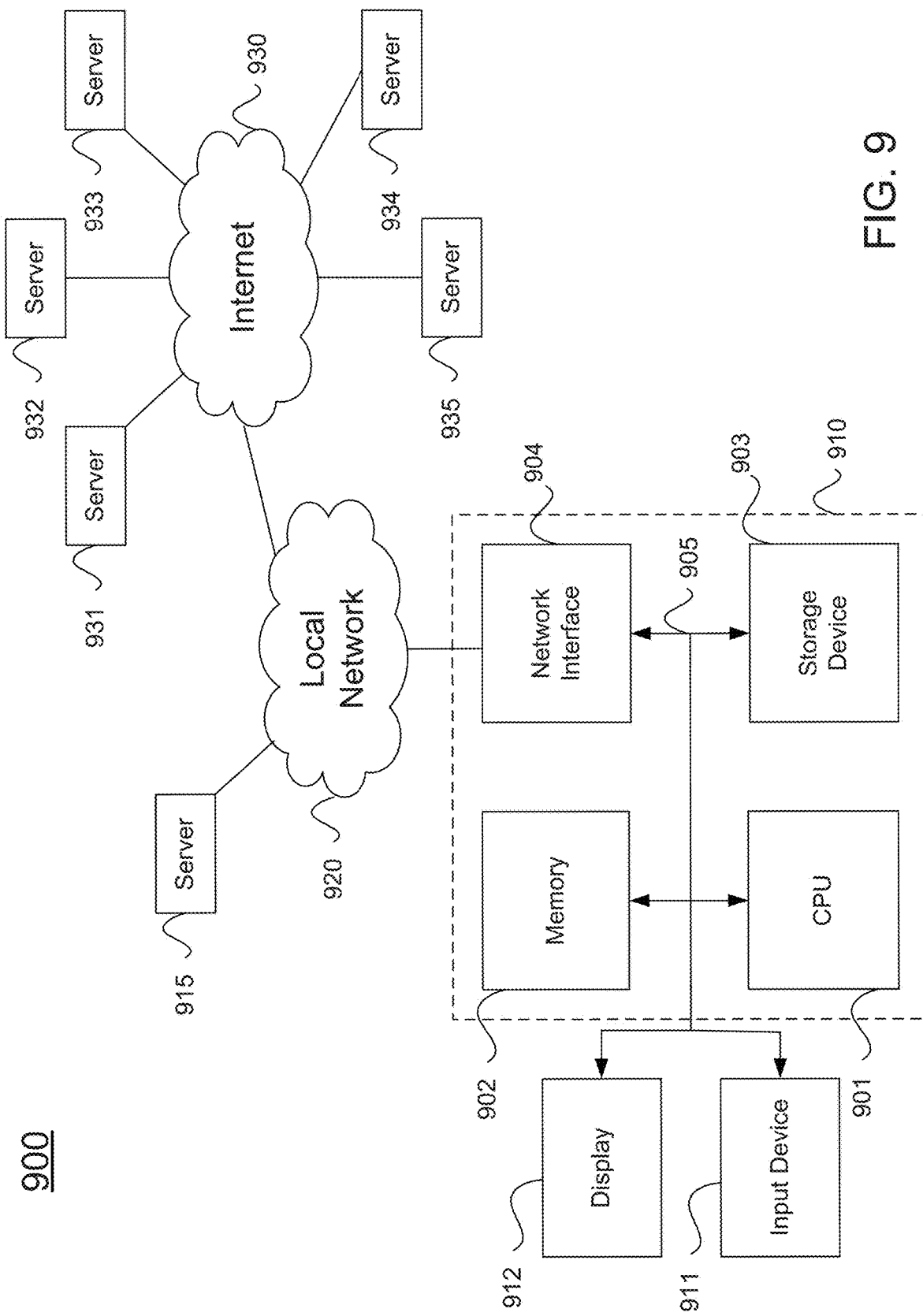
FIG. 9 illustrates an example computer system.

An example computer system 900 is illustrated in FIG. 9. Computer system 910 includes a bus 905 or other communication mechanism for communicating information, and a processor 901 coupled with bus 905 for processing information. Computer system 910 also includes a memory 902 coupled to bus 905 for storing information and instructions to be executed by processor 901, including information and instructions for performing the techniques described above, for example. This memory may also be used for storing variables or other intermediate information during execution of instructions to be executed by processor 901. Possible implementations of this memory may be, but are not limited to, random access memory (RAM), read only memory (ROM), or both. A storage device 903 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 903 may include source code, binary code, or software files for performing the techniques above, for example. Storage device and memory are both examples of computer readable mediums.

Computer system 910 may be coupled via bus 905 to a display 912, such as a cathode ray tube (CRT) or liquid crystal display (LCD), for displaying information to a computer user. An input device 911 such as a keyboard and/or mouse is coupled to bus 905 for communicating information and command selections from the user to processor 901. The combination of these components allows the user to communicate with the system. In some systems, bus 905 may be divided into multiple specialized buses.

Computer system 910 also includes a network interface 904 coupled with bus 905. Network interface 904 may provide two-way data communication between computer system 910 and the local network 920. The network interface 904 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 904 sends and receives electrical, electromagnetic, or optical signals that carry digital data streams representing various types of information.

Computer system 910 can send and receive information, including messages or other interface actions, through the network interface 904 across a local network 920, an Intranet, or the Internet 930. For a local network, computer system 910 may communicate with a plurality of other computer machines, such as server 915. Accordingly, computer system 910 and server computer systems represented by server 915 may form a cloud computing network, which may be programmed with processes described herein. In the Internet example, software components or services may reside on multiple different computer systems 910 or servers 931-935 across the network. The processes described above may be implemented on one or more servers, for example. A server 931 may transmit actions or messages from one component, through Internet 930, local network 920, and network interface 904 to a component on computer system 910. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
an engine of a persistence layer organized according to an object framework, receiving a service call from an interface layer organized according to an entity framework, the service call referencing an entity;
the engine determining a context of a core object in the persistence layer, the context includes a path reflecting the hierarchical structure between a root node of the core object and an entity node corresponding to the entity;
the engine constructing a prepared object by traversing the core object according to the path, said traversing the core object includes reading sub-nodes between the root node and the entity node, the prepared object including the entity node;
the engine enriching the entity node with entity data from the service call, to generate an applied object;
the engine referencing the applied object as a parameter to execute the service call on the core object; and
the engine mapping the core object to a result object returned to the interface layer in response to the service call.

2. A method as in claim 1 wherein the mapping is performed according to the path between the entity node and the root node.

3. A method as in claim 2 wherein:
the engine constructs the prepared object by reading an entirety of the core object.

4. A method as in claim 2 wherein:
the engine constructs the prepared object by partially reading the core object only up to the entity node, according to the path.

5. A method as in claim 2 wherein the prepared object comprises a corresponding key for each of the entity node, the root node, and the sub-nodes of the path.

6. A method as in claim 1 further comprising:
the engine examining a complexity of the core object to determine whether to,
construct the prepared object by reading an entirety of the core object, or
construct the prepared object by partially reading the core object only up to the entity node.

7. A method as in claim 1 wherein:
the core object is stored in an in-memory database of the persistence layer; and
the engine comprises an in-memory database engine of the in-memory database.

8. A method as in claim 7 wherein the applied object is stored in the in-memory database.

9. A method as in claim 1 wherein the entity framework comprises Open Data Protocol (OData).

10. A method as in claim 1 wherein the object framework comprises JAVA programming language or Node.js.

11. A non-transitory computer readable storage medium embodying a computer program for performing a method, said method comprising:
an engine of a persistence layer organized according to an object framework, receiving a service call from an interface layer organized according to an entity framework, the service call referencing an entity;
the engine determining a context of a core object in the persistence layer, the context includes a path reflecting the hierarchical structure between a root node of the core object and an entity node corresponding to the entity;
the engine constructing a prepared object by traversing the core object according to the path, said traversing the core object includes reading sub-nodes between the root node and the entity node, the prepared object including the entity node, wherein the engine constructs the prepared object by partially reading the core object only up to the entity node according to the path;
the engine enriching the entity node with entity data from the service call, to generate an applied object;
the engine referencing the applied object as a parameter to execute the service call on the core object; and
the engine mapping the core object to a result object returned to the interface layer in response to the service call, the mapping performed according to the path.

12. A non-transitory computer readable storage medium as in claim 11, wherein the method further comprises:
the engine examining a complexity of the core object to determine to construct the prepared object by partially reading the core object only up to the entity node.

13. A non-transitory computer readable storage medium as in claim 11 wherein the prepared object comprises a corresponding key for each of the entity node, the root node, and the sub-nodes of the path.

14. A non-transitory computer readable storage medium as in claim 11 wherein:
the core object is stored in an in-memory database of the persistence layer; and
the engine comprises an in-memory database engine of the in-memory database.

15. A non-transitory computer readable storage medium as in claim 11 wherein the context comprises metadata.

16. A computer system comprising:
one or more processors;
a software program, executable on said computer system, the software program configured to cause an in-memory database engine of a persistence layer organized according to an object framework, to:
receive a service call from an interface layer organized according to an entity framework, the service call referencing an entity;
determine a context of a core object of an in-memory database of the persistence layer, the context includes a path reflecting the hierarchical structure between a root node of the core object and an entity node corresponding to the entity;
construct a prepared object by traversing the core object according to the path, said traversing the core object includes reading sub-nodes between the root-node and the entity node, the prepared object including the entity node;
enrich the entity node with entity data from the service call, to generate an applied object;
reference the applied object as a parameter to execute the service call on the core object; and
map the core object to a result object returned to the interface layer in response to the service call, according to a path between the entity node and a root node.

17. A computer system as in claim 16 wherein:
the software program is configured to cause the in-memory database engine to construct the prepared object by reading an entirety of the core object.

18. A computer system as in claim 16 wherein the software program is configured to cause the in-memory database engine to construct the prepared object by partially reading the core object only up to the entity node, according to the path.

19. A computer system as in claim 16 wherein the software program is configured to cause the in-memory database engine to examine a complexity of the core object to determine whether to,
- construct the prepared object by reading an entirety of the core object, or
- construct the prepared object by partially reading the core object only up to the entity node.

20. A computer system as in claim 16 wherein the prepared object comprises a corresponding key for each of the entity node, the root node, and the sub-nodes of the path.

* * * * *